July 8, 1952  A. F. CHOUINARD  2,602,870
AUTOMATIC ALTERNATING CURRENT ARC WELDING SYSTEM
Filed Oct. 18, 1949  6 Sheets-Sheet 1

Fig. 1

INVENTOR.
Alfred F. Chouinard,
BY
Robert R. Lockwood
Atty.

July 8, 1952 A. F. CHOUINARD 2,602,870
AUTOMATIC ALTERNATING CURRENT ARC WELDING SYSTEM
Filed Oct. 18, 1949 6 Sheets-Sheet 2

INVENTOR.
Alfred F. Chouinard,
BY
Robert R. Lockwood
Atty.

July 8, 1952     A. F. CHOUINARD     2,602,870
AUTOMATIC ALTERNATING CURRENT ARC WELDING SYSTEM
Filed Oct. 18, 1949     6 Sheets-Sheet 6

Fig. 13.
JOG UP

Fig. 14.
JOG DOWN

Fig. 15
FEED DOWN
UNDER CONTROL
OF ARC VOLTAGE

Fig. 16.
CRATER
ELIMINATION
FEED UP

INVENTOR.
Alfred F. Chouinard.
BY
Robert R. Lockwood
Atty.

Patented July 8, 1952

2,602,870

UNITED STATES PATENT OFFICE 2,602,870

AUTOMATIC ALTERNATING CURRENT ARC WELDING SYSTEM

Alfred F. Chouinard, Chicago, Ill., assignor to National Cylinder Gas Company, Chicago, Ill., a corporation of Delaware Application October 18, 1949, Serial No. 122,029

22 Claims. (Cl. 219—8)

My invention relates, generally, to arc welding systems, and it has particular relation to automatic arc welding systems. This application is a continuation-in-part of application Serial No. 63,114, filed December 2, 1948, now abandoned, and assigned to the assignee of this application.

Among the objects of my invention are: To provide for feeding a welding electrode to maintain an arc between it and work on which a welding operation is to be performed, the feeding of the electrode taking place at a speed which is determined by the voltage across the arc; to oppose a voltage derived from the arc voltage and a fixed voltage for controlling the speed of an electric motor which is arranged to feed or drive the electrode; to add these voltages for these purposes; to employ a fixed voltage which is substantially lower than the voltage derived from the arc for these purposes; to connect the motor for energization directly to the fixed voltage source when the arc voltage is reduced to a predetermined value in such manner as to reverse it and retract the electrode, thereby causing the arc voltage to increase; to provide for operating the motor under manual control in either direction; to maintain the arc from a source of alternating current and to derive the fixed voltage from such source; to employ a transformer having a relatively high ratio of transformation to provide a relatively high voltage from a relatively low welding arc voltage for the purpose of opposing or adding to the fixed voltage; to employ energy derived only from the arc circuit to operate the motor for feeding the electrode toward and away from the work; to control the direction of rotation of the motor by a reversing relay; and to energize the operating winding of the relay from the arc circuit.

Other objects of my invention will, in part, be obvious and in part appear hereinafter.

My invention is disclosed in the embodiments thereof shown in the accompanying drawings and it comprises the features of construction, combination of elements, circuit connections and arrangement of parts which will be exemplified in the constructions hereinafter set forth and the scope of the application of which will be indicated in the appended claims.

For a more complete understanding of the nature and scope of my invention, reference can be had to the following detailed description, taken together with the accompanying drawings, in which.

Figure 1:
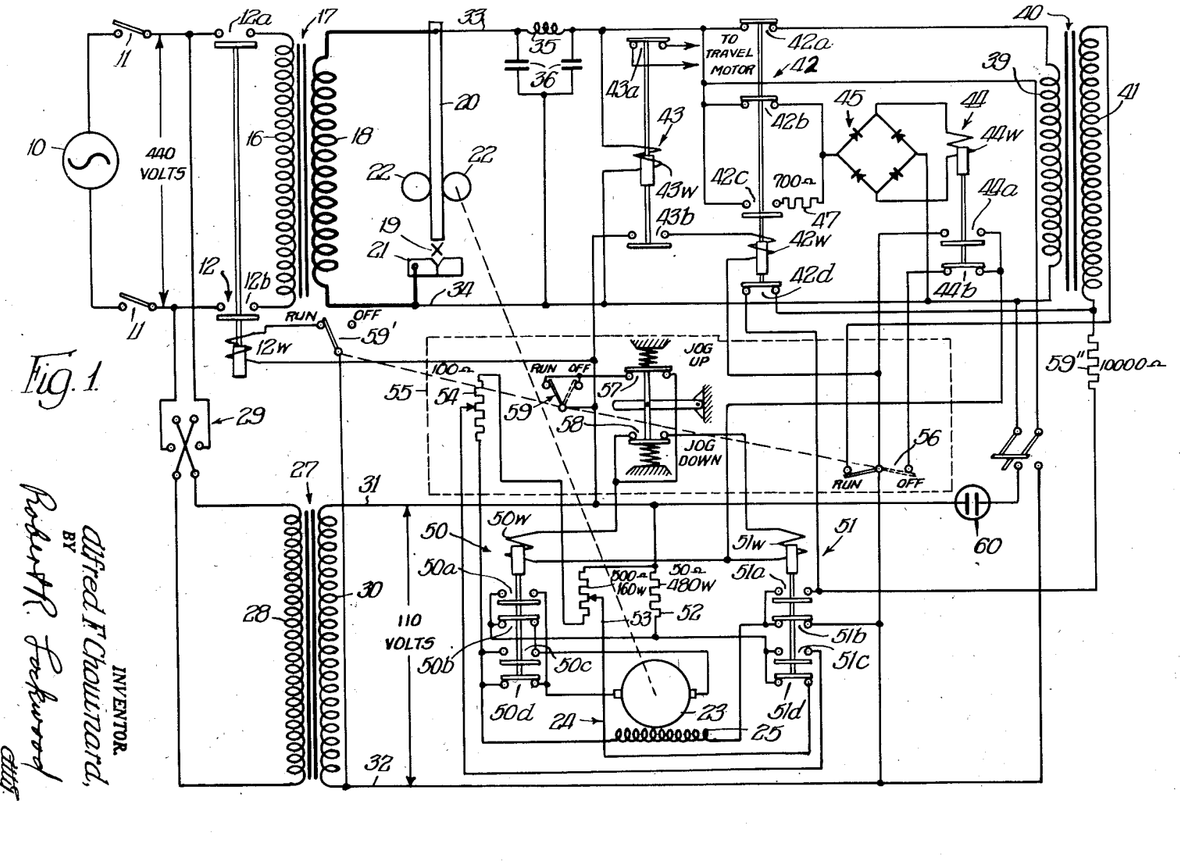
Figure 1 illustrates diagrammatically the circuit connections which can be employed in practicing my invention.

Referring now particularly to Figure 1 of the drawings, it will be observed that the reference character 10 designates a source of alternating current, such as a sixty cycle source. For illustrative purposes the source 10 has been indicated as providing a voltage of 440 volts for energizing the system to be described presently. One terminal of the source 10 may be grounded and the chassis of the control apparatus to be described may be connected to the same ground. It will be understood that any conventional source of alternating current can be employed and that the source 10 is merely representative of such conventional source. The source 10 may be connected by switches 11 and a line contactor 12 for energizing the primary winding 16 of a welding transformer that is shown generally at 17. The welding transformer 17 has a low voltage secondary winding 18 which, in conventional manner, may be connected to maintain a welding arc 19 between a welding electrode 20 and work 21 on which the welding operation is to be performed.

With a view to feeding the welding electrode forwardly toward the work 21 and retracting it therefrom, feed rollers 22 are provided. One or more of these feed rollers may be connected, as shown, to an armature 23 of a series type motor that is indicated, generally, at 24. The motor 24 includes a series field winding 25. As will appear hereinafter, the armature 23 and series field winding 25 are connected in series circuit relation and provision is made for reversing the connections of one with respect to the other for the purpose of feeding the welding electrode 20 toward or away from the work 21.

It will be noted that an auxiliary transformer, shown generally at 27, is provided having a primary winding 28 which is connected to be energized through a reversing switch 29 from the source 10 when the switches 11 are closed. The transformer 27 has a secondary winding 30 which is arranged to energize conductors 31 and 32 with a fixed voltage. This voltage is indicated as being 110 volts. It will be understood that this figure is stated for illustrative purposes only since, with appropriate changes in design, another fixed voltage can be employed.

It is pointed out that, in general, the speed at which the motor 24 moves the electrode 20 forwardly toward the work 21 is controlled by the difference between the fixed voltage which is maintained between the conductors 31 and 32 and a voltage which is derived from the voltage across the arc 19. As will appear presently, provision is made for deriving a voltage from the arc 19 which is substantially higher than the arc voltage and also is substantially higher than the voltage maintained between the conductors 31 and 32. These two voltages are combined in opposed phase relationship so that their difference is applied to the armature 23 and series field winding 25 in series so that the former rotates at a speed which, in effect, is determined by the voltage across the arc 19. Thus, as the voltage across the arc 19 increases, the speed at which the armature 23 rotates is increased to effect a faster forward feeding of the electrode 20. Conversely, when the voltage across the arc 19 decreases, the effective voltage applied to the armature 23 and series field winding 25 is reduced and, accordingly, the armature 23 rotates at a slower speed.

It will be noted that the voltage across the arc 19 is applied between conductors 33 and 34. A filter comprising a high frequency choke coil 35, connected in the conductor 33, and capacitors 36 connected between the conductors 33 and 34, is employed for preventing high frequency oscillations from the arc 19 being applied to the control system connected to the conductors 33 and 34.

As pointed out above, provision is made for obtaining a voltage which is a function of the voltage across the arc 19 but which is substantially greater in magnitude. For this purpose a primary winding 39 of a transformer, shown generally at 40, is connected for energization across the conductors 33 and 34. The transformer 40 has a secondary winding 41. The transformer 40 has a high ratio of transformation. For example, the number of turns on the secondary winding 41 may be about eight times the number of turns on the primary winding 39. It will be understood, however, that other ratios of transformation can be employed with appropriate changes in design of the remaining circuit constants.

The windings 39 and 41 of the transformer 40 may be connected into the circuit by an auxiliary relay which is indicated, generally, at 42. The normally closed contacts 42a and 42d are arranged, as shown, to accomplish this purpose. The auxiliary relay 42 is arranged to be controlled by a high arc voltage responsive relay which is shown generally at 43. It will be observed that the relay 43 has a winding 43w which is connected for energization across the conductors 33 and 34. When the voltage between these conductors exceeds about forty-five volts, as when the welding electrode 20 is spaced away from the work 21 and no arc 19 is present therebetween, the winding 43w is energized sufficiently to close its contacts 43b and energize the winding 42w of the auxiliary relay 42. It will be observed that the relay 43 has normally closed contacts 43a which, as indicated, may be connected to the circuit which controls the travel motor that is arranged, in accordance with conventional practice, to move the work 21 relative to the electrode 20 while the welding operation is being performed.

A low arc voltage responsive relay, shown generally at 44, also is employed for effecting certain control functions to be described presently. The winding 44w of the relay 44 is connected for energization across a full wave rectifier that is indicated, generally, at 45. The rectifier 45 is connected for energization across conductors 33 and 34 through either contacts 42b or contacts 42c, depending upon which are closed. A resistor 47 is provided for limiting the current flow through the rectifier 45 when contacts 42c are closed and the open circuit voltage appears between conductors 33 and 34. The resistor 47 may have a resistance of 700 ohms.

With a view to reversing the connections between the armature 23 and the series field winding 25, a reversing relay, shown generally at 50, is provided. The relay 50 functions in conjunction with a transfer relay, shown generally at 51, which is provided for shifting the connections of the motor 24 from directly across the conductors 31 and 32 between which the fixed voltage is maintained to the circuit which includes this fixed voltage in opposed phase relationship to the voltage appearing across the secondary winding 41 of the transformer 40. The manner in which this is accomplished will be described presently. The current flow to the motor 24 may be limited by a resistor 52 having a resistance of fifty ohms and a capacity of 480 watts. In addition an adjustable resistor 53, having a resistance of 500 ohms and a capacity of 160 watts, may be connected in parallel with the resistor 52 and in series with an adjustable resistor 54. The resistor 53 is provided for varying the speed at which the motor 24 feeds and retracts the welding electrode 20 while the resistor 54 is provided for adjusting the system so that the electrode 20 is fed at different rates depending upon the arc voltage which it is desired to maintain between the electrode 20 and the work 21. The adjustable resistor 54 may be located on the operator's panel, indicated within the rectangle bounded by the broken lines at 55. It will be understood that the operator's panel is located preferably close to the welding head which includes the feed rollers 22 that drive the welding electrode 20 toward and away from the work 21.

In order to permit movement of the electrode 20 in one direction or the other without energization of the welding transformer 17, a control switch, shown generally at 56, is provided. This switch has two positions. The one shown by the broken lines and indicated as the off position closes the circuit from the conductor 32 through contacts 44b, winding 50w and 51w, contacts 57 and 58, switch 59 to conductor 31. This circuit energizes relays 50 and 51 and prevents the motor 24 from feeding or retracting electrode 20 while the transformer 17 is not energized unless contact 57 or 58 is broken intentionally. This switch replaces the circuit through contacts 44a to be described. When the switch 56 is operated to the alternate or run position as shown by the full lines, the motor may be under the automatic control of the system and in addition may be operated manually as will be described presently.

It is desirable to provide for manually operating the motor 24. For this purpose contacts 57 and 58 are provided. These contacts are normally closed, as indicated. The contacts 57 may be identified as the jog up contacts while the contacts 58 may be identified as the jog down contacts. They are arranged, as indicated, to be operated manually and the construction is such that only one of the sets of contacts 57 or 58 can be opened at the same time.

An auxiliary control switch 59 is employed for preventing the formation of a crater on the work 21 or sticking of the electrode 20 thereto on termination of the welding operation. It is a single pole double throw switch and operates in conjunction with the switch 56 as indicated by the mechanical connection, shown by the broken line, between their movable contact or blade members. The auxiliary control switch 59 is connected between contacts 57 and conductor 31 and serves to open and then close again the circuit through these contacts when it is shifted from the off to the run position and vice versa. This provides a reversal of the motor 24 for a short period of time before the welding power is turned off.

Another auxiliary control switch 59' is operated is conjunction with the switches 56 and 59 to complete the energizing circuit for the operating winding 12w of the line contactor 12 when the former are operated to the run position.

In order to determine the proper position of the reversing switch 29, a glow discharge tube 60, such as a neon lamp, may be connected by a double pole single throw toggle switch 61 in series with the secondary windings 18 and 30. The proper position of the reversing switch 29 is indicated when the tube 60 glows brightly on closure of the switch 61.

Figure 5:
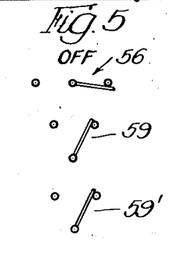
Figures 5, 6 and 7 show the different positions of certain of the manually operable control switches.

In describing the operation of the system shown in the drawings, it will be assumed that the welding electrode 20 is out of engagement with the work 21 and that the control switches 56, 59 and 59' are in their off positions as shown in Figure 5. The switches 11 now are closed and the primary winding 28 of the auxiliary transformer 27 is energized. This energizes the secondary winding 30 and the conductors 31 and 32 have the fixed voltage impressed therebetween. The reversing relay 50 and the transfer relay 51 are energized. The circuit for energizing them can be traced from the conductor 31 through the switch 59, the jog up contacts 57, operating winding 50w of relay 50, the jog down contacts 58, operating winding 51w of relay 51, contacts 44b of the low arc voltage responsive relay 44, and switch 56 in the off position to the other energized conductor 32.

Figure 7:
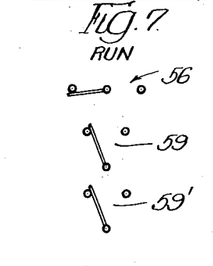

Now it will be assumed that the control switches 56, 59 and 59' are operated to the run position shown in Figure 7. As a result the relays 50 and 51 are deenergized since the circuit previously traced for energizing their operating windings 50w and 51w is opened by switch 56. The line contactor 12 then is energized over a circuit which may be traced from the energized conductor 31, operating winding 12w of the contactor 12, and the switch 59' in the run position to the other energized conductor 32. At contacts 12a and 12b circuits are completed for energizing the primary winding 16 of the welding transformer 17 by connecting it to the 440 volt source 10. The switch 61 may be operated momentarily to check the position of the reversing switch 29.

Since the welding electrode 20 is assumed to be out of contact with the work 21, the open circuit voltage of the secondary winding 18 appears therebetween. This voltage may be of the order of from 80 to 90 volts. Since this voltage is in excess of the voltage for example 45 volts, required as a minimum to energize the high arc voltage responsive relay 43, its winding 43w is energized. Its contacts 43a are opened and its contacts 43b are closed. An obvious energizing circuit for the operating winding 42w of the auxiliary relay 42 is completed at contacts 43b. The auxiliary relay 42 is energized to open the circuit to the primary winding 39 at contacts 42a and the circuit to the secondary winding 41 at contacts 42d. In order to reduce the arcing across contacts 42d a resistor 59" of relatively high value may be connected thereacross. As illustrated, this resistor may have a resistance of 10,000 ohms.

As a result of the energization of the conductors 33 and 34 by the open circuit voltage of the secondary winding 18, the rectifier 45 is energized through contacts 42c and resistor 47. Accordingly, the low arc voltage responsive relay 44 is energized and at its contacts 44a a circuit is completed for energizing the windings 50w and 51w of the relays 50 and 51. This energizing circuit is the same as previously traced except that it is completed through contacts 44a instead of contacts 44b. Since the transfer relay 51 is energized and the circiut to the secondary winding 41 of the transformer 40 is opened at contacts 42d, the energizing circuit for the motor 24 is open and it cannot be energized except in the manner to be described now.

Figure 2:
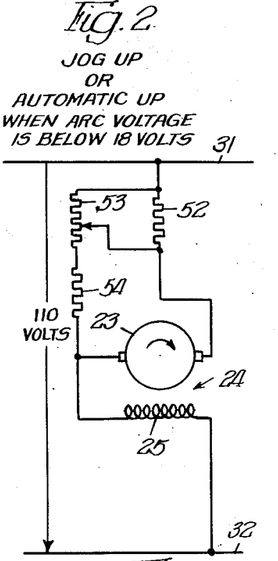
Figures 2, 3 and 4 are circuit diagrams which show the connections to the motor for operating it in either a forward or a reverse direction under different operating conditions.

It will be assumed next that it is desired to retract the electrode 20 from the work 21 still further. Accordingly, the jog up contacts 57 are opened. This opens the previously traced circuit for the energizing windings 50w and 51w of the relays 50 and 51 and both of these relays drop. The armature 23 and series field winding 25 then are connected in series circuit relation through the resistor 52 and across the energized conductors 31 and 32. These circuit connections are illustrated in Figure 2. The speed at which the armature 23 rotates to withdraw the electrode 20 is determined, in part, by the adjustment of the adjustable resistor 53. The motor 24 continues to retract the electrode 20 at a fixed speed as long as the contacts 57 are held open. As soon as they are permitted to close, the relays 50 and 51 are energized again and the motor 24 is deenergized.

Figure 3:
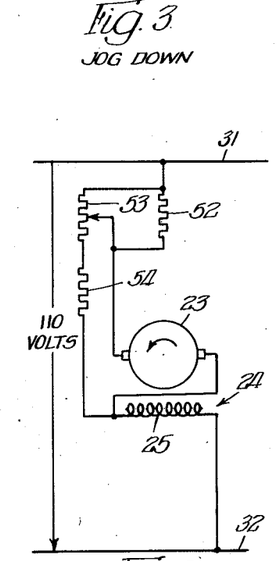

Now it will be assumed that it is desired to move the electrode 20 downwardly to engage the work 21. Accordingly, the jog down contacts 58 are opened. This action opens the energizing circuit to the winding 51w of the transfer relay 51 but, as indicated in Figure 1, the energizing circuit for the winding 50w of the reversing relay 50 is not opened. Since the reversing relay 50 remains energized, the connections to the armature 23 are reversed with respect to the connections to the series field winding 25. This is illustrated in Figure 3 of the drawings. As a result the armature 23 rotates in a direction which is the reverse of that shown in Figure 2 and, accordingly, the electrode 20 is moved forwardly. Here again the motor 24 is energized directly from the fixed voltage maintained between the conductors 31 and 32.

It will be assumed that the electrode 20 is moved sufficiently far forwardly so that it engages the work 21. When this occurs, the voltage between the conductors 33 and 34 falls and the operating winding 43w of the high arc voltage responsive relay 43 is deenergized sufficiently to permit this relay to drop. As a result the auxiliary relay 42 drops. At contacts 42a and 42d the primary winding 39 and the secondary winding 41 of the transformer 40 are connected into the control circuit. Also, since the voltage between the conductors 33 and 34 has been reduced below the minimum voltage required to hold the relay 44 in the energized position, it drops and at contacts 44a opens the energizing circuit for the windings 50w and 51w of the relays 50 and 51. Accordingly, they drop. The motor 24 is now energized over the circuits indicated in Figure 2. It reverses and the armature 23 drives the electrode 20 in the reverse direction away from the work 21. The arc 19 is established between the electrode 20 and the work 21 and the voltage between the conductors 33 and 34 is increased sufficiently to energize the winding 44w of the relay 44 and it pulls in. The winding 44w is energized through the rectifier 45 which is connected by contacts 42b between the conductors 33 and 34. Since the voltage between the conductors 33 and 34 is relatively low, i. e. of the order of twenty-five volts, the winding 43w of the relay 43 is not energized sufficiently to pull this relay in. Accordingly, the auxiliary relay 42 is not energized.

Figure 4:
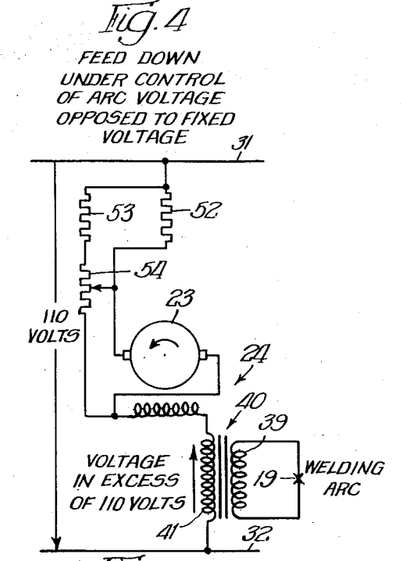

As soon as the low arc voltage responsive relay 44 is energized and its contacts 44a are closed, the previously traced energizing circuits for the windings 50w and 51w of the relays 50 and 51 are completed and both of these relays are energized. The circuits now completed for energizing the motor 24 are illustrated in Figure 4. Since transfer relay 51 is energized, the armature 23 and series field winding 25 are connected in series circuit relation with the secondary winding 41 of the transformer 40. The voltage which is induced in the secondary winding 41, as indicated, is opposite in phase to the voltage between the conductors 31 and 32. As a result, the motor 24 is energized at a voltage which is the difference between the voltage induced in the secondary winding 41 and the voltage maintained between the conductors 31 and 32. By way of example, it is pointed out that, if the ratio of transformation for the transformer 40 is one to eight and the voltage between the conductors 33 and 34, i. e. the arc voltage, is thirty-one volts, then the voltage appearing across the secondary winding 41 will be 248 volts. This voltage is opposed by the fixed voltage maintained between the conductors 31 and 32 which, as indicated, is 110 volts. Accordingly, the difference or 138 volts is available in the circuit in which the motor 24 is connected for operating it forwardly at this particular arc voltage. Now assume that the arc voltage is reduced to thirty volts. Then the voltage across the secondary winding 41 is 240 volts and a voltage of 130 is available in the circuit shown in Figure 4 for operating the motor 24. Likewise, if the arc voltage is reduced to twenty-nine volts, the voltage across the secondary winding 41 is 232 volts and a voltage of 122 volts is available for operating the motor 24. As the arc voltage decreases, the voltage for energizing the motor 24 is decreased and its speed is correspondingly reduced. In this manner the system is self-compensating and the arc voltage tends to be maintained about a fixed mean value which is determined by the setting of the adjustable resistor 54.

Now when the arc voltage is reduced to such a value that the winding 44w of the low arc voltage responsive relay 44 is not held in, i. e. when the arc voltage is reduced to eighteen volts, the relay 44 drops and relays 50 and 51 likewise drop since the energizing circuit for their windings is opened at contacts 44a. The circuit connections for the motor 20 are then changed to those shown in Figure 2 where the motor 24 is connected for energization directly between the conductors 31 and 32. It reverses and withdraws the electrode 20 until the normal arc voltage of twenty-five volts is established. Thereupon the low arc voltage responsive relay 44 picks up and at contacts 44a the circuit for energizing the windings 50w and 51w of the relays 50 and 51 is reestablished. The motor 24 then is connected in the circuit as shown in Figure 4 and it operates to feed the electrode 20 forwardly. The system is adjusted so that with arc voltages between eighteen and forty-five volts it operates in the manner just described.

In the event that the welding electrode 20 should become stuck for some reason so that the motor 24, although trying to feed it forwardly, could not accomplish this, then the arc voltage increases since the electrode 20 is consumed. When the arc voltage increases to about forty-five volts the winding 43w of the high arc voltage responsive relay 43 is energized. It opens contacts 43a to deenergize the travel motor and stop further movement of the work 21. At contacts 43b the circuit is completed for energizing the winding 42w of the auxiliary relay 42. At contacts 42a and 42d the circuits for the primary winding 39 and secondary winding 41 are opened. As a result the energizing circuit for the motor 24, as shown in Figure 4, is opened and the motor 24 stops.

Figure 6:
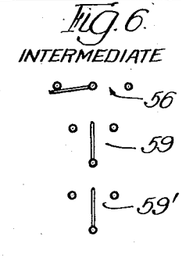

Now it will be assumed that the welding operation is proceeding and the circuit connections are as illustrated in Figure 4. Further it will be assumed that the control switches 56, 59 and 59' are operated from the run position, shown in Figure 7, through their intermediate position shown in Figure 6. In the intermediate position of the switch 59 the energizing circuit for the windings 50w and 51w through the contacts 57 and 58 is opened. The relays 50 and 51 drop and the motor 24 reverses since it now is connected as shown in Figure 2. The arc 19 is lengthened since the electrode 20 is withdrawn from the work 21. When the control switch 59' is opened the energizing circuit for the winding 12w of the line contactor is opened and the welding transformer 17 is deenergized. The welding operation immediately ceases. Since the electrode 20 has been withdrawn from the work 21, there is no tendency for it to stick to the molten pool of metal and no crater is formed therein. However, the transformer 27 is still energized and the fixed voltage is maintained between the conductors 31 and 32. The jog up contacts 57 or the jog down contacts 58 can be opened to effect movement of the electrode 20 in either the up or the down direction in the manner described previously since the switch 59 is closed and the relays 50 and 51 are energized.

Figure 8:
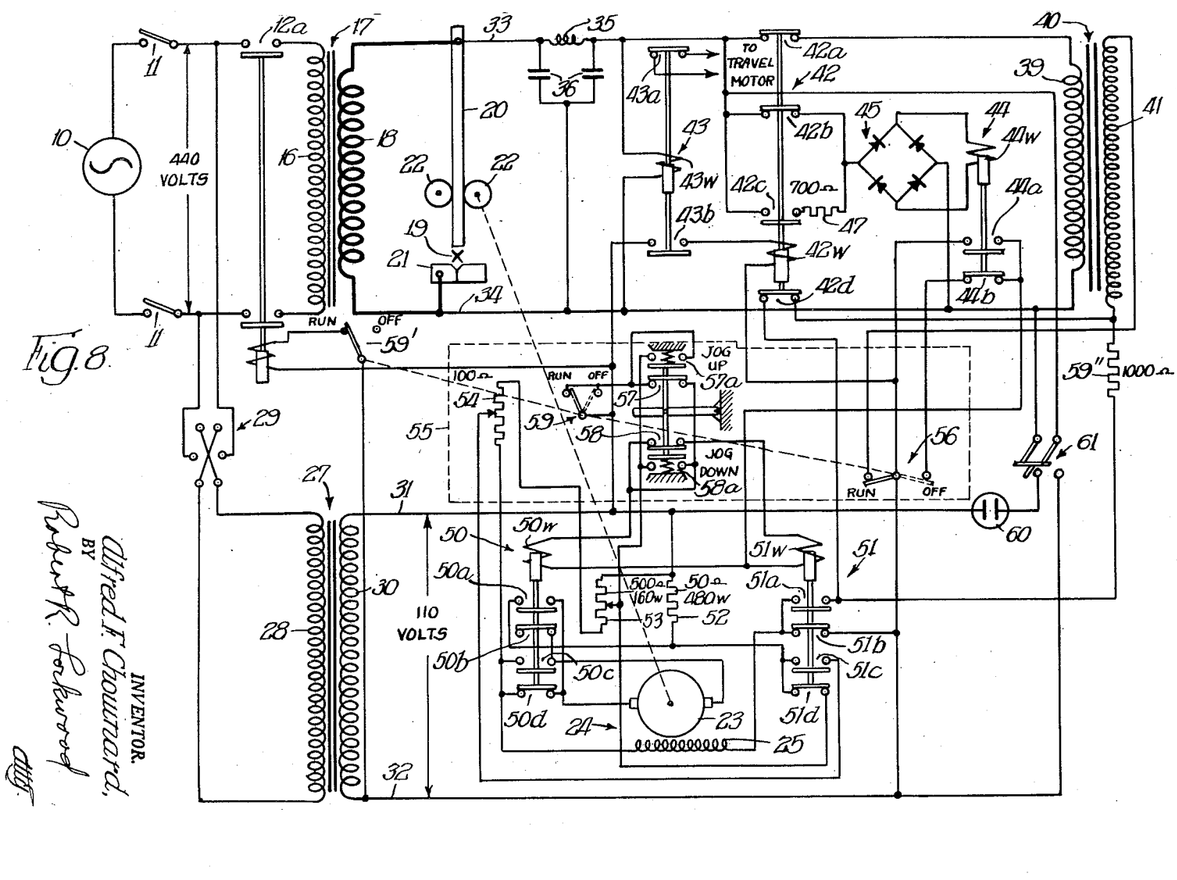
Figure 8 illustrates diagrammatically certain modifications of the circuit connections as shown in Figure 1.
Figure 11:
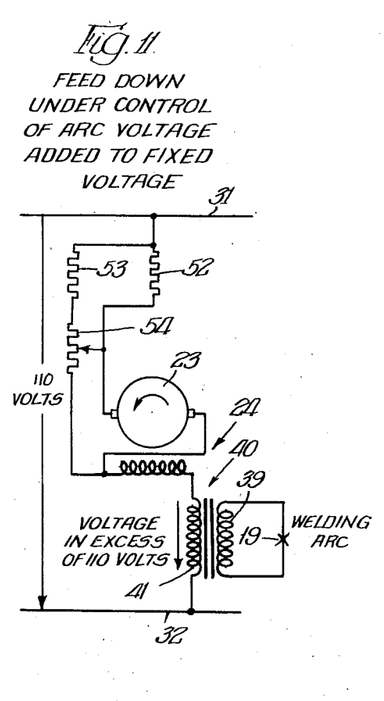

In Figure 8 of the drawings the circuit connections are generally similar to those shown in Figure 1 and described herein before. One difference resides in the connection of the secondary winding 41 of the transformer 40 in relation to the conductors 31 and 32 between which there is a fixed voltage maintained. As shown in Figure 11 the voltage which is induced in the secondary winding 41 from the arc circuit including the welding arc 19 is added to the voltage which is maintained between the conductors 31 and 32. This provides a higher voltage for energizing the motor 24 for feeding the welding electrode 20 toward the work 21 than is the case when the voltages are opposed as illustrated in Figure 4.

Figure 9:
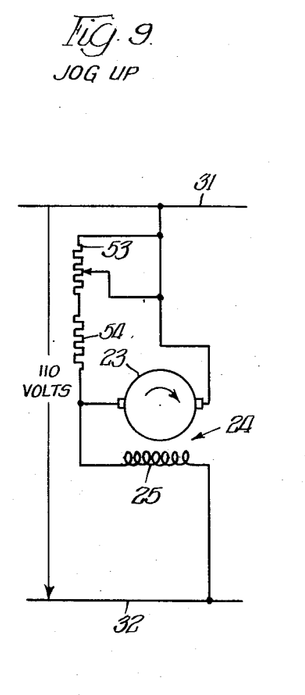
Figures 9, 10 and 11 are circuit diagrams which show the connections to the motor using the circuit connections as shown in Figure 8 for operating it in either a forward or a reverse direction under different operating conditions.
Figure 10:
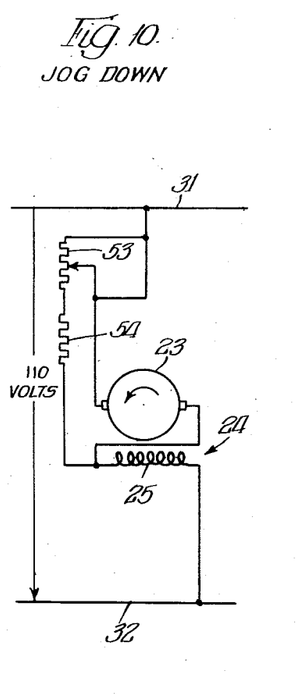

Another change in the circuit connection as shown in Figure 8 over those shown in Figure 1 is in the provision of additional contacts 57a and 58a which are normally open and which are arranged to be closed when the jog up and jog down contacts 57 and 58 are operated respectively. When the jog up contacts 57 are opened, contacts 57a are closed and, as shown in Figure 9, the resistor 52 is short circuited so that the motor 24 is connected directly between the conductors 31 and 32 without the interposition of the series resistor 52. In like manner, when the jog down contacts 58 are opened, contacts 58a are closed and, as shown in Figure 10, the resistor 52 is short circuited and the motor 24 is connected directly between the conductors 31 and 32 for feeding the electrode 20 downwardly toward the work 21.

When the arc voltage falls below a predetermined value when the system shown in Figure 8 is employed, the low arc voltage responsive relay 44 is deenergized sufficiently so that it drops to the open position. Thereupon the motor 24 is reversed to withdraw the electrode 20 from the work 21 and the circuit for energizing the same is that shown in Figure 2 and described herein before.

In the embodiment of the invention illustrated in Figures 12 through 16 of the drawings provision is made for connecting the motor 24 for energization through the transformer 40 across the welding arc 19, the arrangement being such that the energy for operating the motor 24 to feed the welding electrode 20 is obtained solely from the arc circuit. The voltage which is derived by the transformer 40 from the arc circuit is not combined with the voltage maintained between the conductors 31 and 32 but rather only the voltage from across the arc 19 is employed as just stated. For this embodiment of the invention the ratio of transformation between the windings 39 and 41 of the transformer 40 is about 1 to 5.

Figure 12:
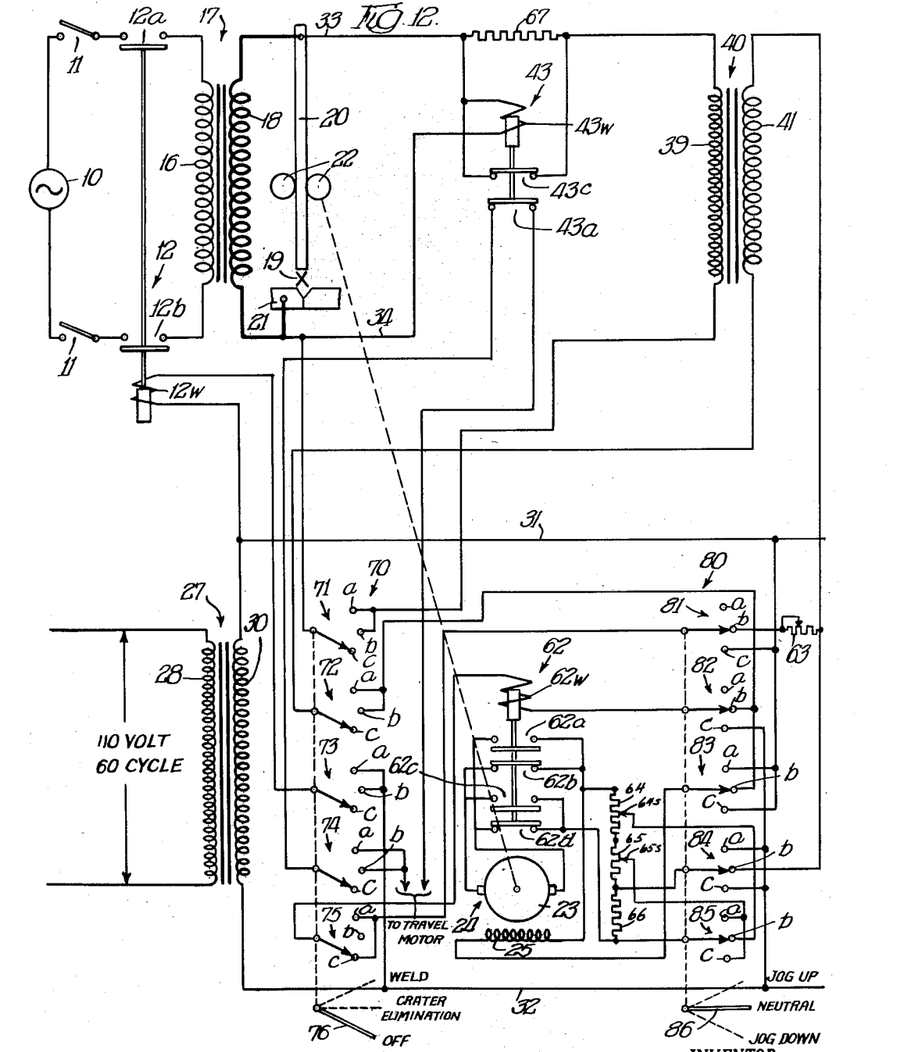
Figure 12 illustrates diagrammatically still another embodiment of my invention in which the energy for operating the motor for feeding the electrode toward the work under welding conditions is derived solely from the arc circuit.

The relationship between the armature 23 and series field winding 25 of the motor 24 can be reversed by a reversing relay which is indicated, generally, at 62. This relay has a winding 62w, normally open contacts 62a—62c, and normally closed contacts 62b—62d. As will appear hereinafter the operating winding 62w is connected for energization under certain operating conditions across the high voltage secondary winding 41 of the transformer 40. In order to adjust the voltage supplied to the winding 62w an adjustable resistor 63 may be provided as indicated.

The speed at which the motor 24 operates is determined, in part, by resistors 64, 65 and 66. Sliders 64s and 65s can be moved along resistors 64 and 65, as indicated, for varying the connections thereto.

With a view to decreasing the voltage which is applied across the primary winding 39 of the transformer 40 when a high open circuit voltage exists between the electrode 20 and the work 21, as when the arc 19 is not maintained therebetween and they are separated, a resistor 67 is connected in series with the primary winding 39. The resistor 67 may be short circuited by normally closed contacts 43c of the high arc voltage responsive relay 43. The operating winding 43w of the relay 43 is connected across the secondary winding 18 of the welding transformer 17 and it is arranged to be energized sufficiently to open contacts 43a and 43c when a high voltage, such as 80 volts, appears across the terminals of the secondary winding 18. Below this voltage and during normal welding operations, operating winding 43w is not energized sufficiently to open contacts 43a and 43c and they remain closed.

Figure 16:
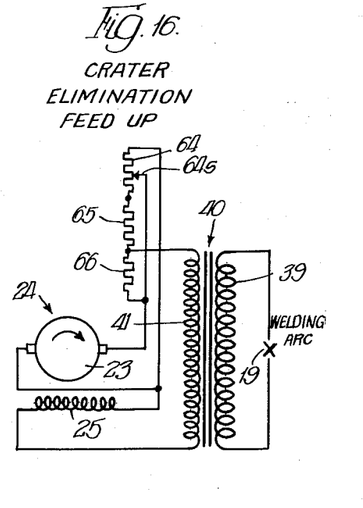

The direction of rotation of the armature 23 is controlled for welding purposes by a manually operated welding control switch which is indicated, generally, at 70. The switch 70 is made up of five switch units 71 through 75 which may be operated by means of a handle 76 to any one of three positions indicated at a, b and c. It will be observed that the switch 70 has three positions. It is shown in the off position. When the handle 76 is moved so that the contacts a are engaged, the system is connected as shown diagrammatically in Figure 15 so that the motor 24 is connected for energization across the high voltage secondary winding 41 of the transformer 40 and acts to feed the welding electrode 20 toward the work 21 at a speed such that a predetermined voltage is maintained across the arc 19. When the handle 76 of the switch 70 is moved to the b position, the connections between the armature 23 and series field winding 25 are reversed, as shown in Figure 16, so that the motor 24 feeds the electrode 20 upwardly at a speed which is determined by the voltage across the arc circuit.

Figure 13:
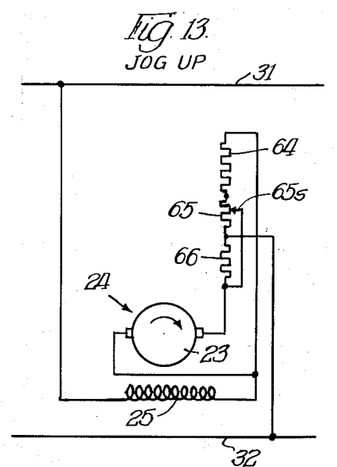
Figures 13, 14, 15 and 16 are circuit diagrams which show the connections to the motor for operating it in either a forward or a reverse direction under different operating conditions and employing the circuit connections as shown in Figure 12.
Figure 14:
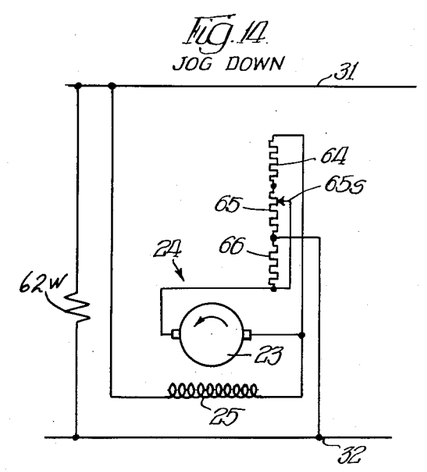
Figure 15:
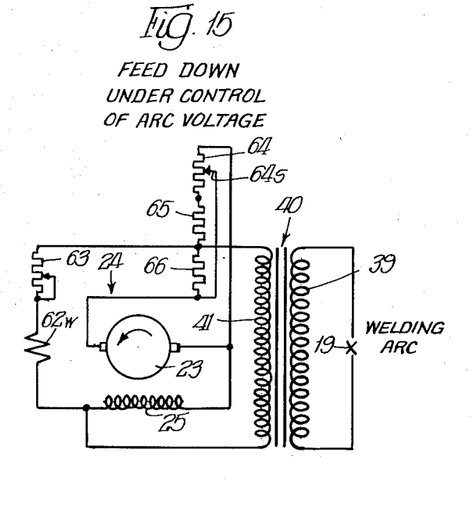

The electrode 20 can be moved toward or away from the work 21 under the control of a manually operated jog switch which is indicated, generally, at 80. The switch 80 is made up of five switch units indicated, generally, at 81 through 85. A handle 86 is provided for operating these switch units together to any one of three positions indicated at a, b, and c. The switch 80 is shown with the handle 86 and the switch units 81 through 85 in the neutral position. The handle 86 can be swung to the a position for jogging the electrode 20 upwardly away from the work 21. The energizing circuit for the motor 20 in the jog-up position of the switch 80 is shown in Figure 13. It will be observed that the motor 24 is connected for energization between the conductors 31 and 32 which have a fixed voltage applied thereto from the secondary winding 30 of the transformer 27. Its primary winding 28 may be energized from the source 10 or a separate source as desired. When the handle 86 is moved to the c or jog down position, the electrode 20 is moved toward the work 21. The circuit connections for the motor 24 for the jog down position are illustrated diagrammatically in Figure 14. It will be observed that the connections between the armature 23 and series field winding 25 are reversed from those shown in Figure 13. Also it will be noted that the operating winding 62w of the reversing relay 62 is connected for energization between the conductors 31 and 32.

The present invention has been described in conjunction with an alternating current system. Where the necessary and proper changes are made in the constants of the circuits and apparatus used, this invention can be employed in a system where the arc 19 is maintained from a direct current source.

Since certain changes can be made in the foregoing constructions and different embodiments of the invention can be made without departing from the spirit and scope thereof, it is intended that all matter shown in the accompanying drawings and described hereinbefore shall be interpreted as illustrative and not in a limiting sense.

I claim as my invention:

1. In an automatic arc welding system wherein a welding electrode is moved relative to work and an arc is maintained therebetween from a current source, in combination, an electric motor for moving said electrode, circuit means for connecting said motor for energization to a fixed voltage source, circuit means in series with said motor for connection across said arc, said fixed voltage being substantially less than the voltage applied to said motor from across said arc whereby said motor is energized to move said electrode toward said work at a speed determined by the voltage across said arc, and relay means responsive to the voltage across said arc and operative when the same is reduced to a predetermined value to connect said motor for energization directly to said fixed voltage source in such manner as to reverse the same to retract said electrode and thereby increase said arc voltage.

2. In an automatic arc welding system wherein a welding electrode is moved relative to work and an arc is maintained therebetween from a current source, in combination, an electric motor including an armature and a series field winding for moving said electrode, circuit means for connecting said armature and series field winding of said motor in series for energization to a fixed voltage source, circuit means in series with said motor for connection across said arc, said fixed voltage being substantially less than the voltage applied to said motor from across said arc whereby it is energized to move said electrode toward said work at a speed determined by the voltage across said arc, relay means for reversing the connections between said armature and said series field winding, and relay means responsive to the voltage across said arc and operative when the same is reduced to a predetermined value to operate said relay means to reverse said connections between said armature and series field winding and to connect said motor for energization directly to said fixed voltage source whereby said motor is reversed and said electrode is retracted thereby causing said arc voltage to increase.

3. In an automatic arc welding system wherein a welding electrode is moved relative to work and an arc is maintained therebetween from a current source, in combination, an electric motor including an armature and a series field winding for moving said electrode, circuit means for connecting said armature and series field winding of said motor in series for energization to a fixed voltage source, circuit means in series with said motor for connection across said arc, said fixed voltage being substantially less than the voltage applied to said motor from across said arc whereby it is energized to move said electrode toward said work at a speed determined by the voltage across said arc, a reversing relay for reversing the connections between said armature and said series field winding, a transfer relay for shifting the energizing circuit for said motor between said circuit means in series and the first mentioned circuit means, and relay means responsive to the voltage across said arc and operative when the same is reduced to a predetermined value to operate said relays to reverse said connections between said armature and said field winding and to connect said motor for energization directly to said fixed voltage source whereby said motor is reversed and said electrode is retracted thereby causing said arc voltage to increase.

4. The invention, as set forth in claim 2, wherein manually operable switch means are connected to control the reversing relay and the transfer relay to operate the motor selectively in one direction or the other to advance or retract the electrode.

5. In an automatic alternating current arc welding system wherein a welding electrode is moved relative to work and an arc is maintained therebetween from an alternating current source, in combination, an electric motor for moving said electrode, circuit means for connecting said motor for energization to a fixed voltage source derived from said alternating current source, circuit means in series with said motor for connection across said arc, said fixed voltage being substantially less than the voltage applied to said motor from across said arc whereby said motor is energized to move said electrode toward said work at a speed determined by the voltage across said arc, and relay means responsive to the voltage across said arc and operative when the same is reduced to a predetermined value to connect said motor for energization directly to said fixed voltage source in such manner as to reverse the same to retract said electrode and thereby increase said arc voltage.

6. In an automatic alternating current arc welding system wherein a welding electrode is moved relative to work and an arc is maintained therebetween from an alternating current source, in combination, an electric motor including an armature and a series field winding for moving said electrode, circuit means for connecting said armature and series field winding of said motor in series for energization to a fixed voltage source derived from said alternating current source, circuit means in series with said motor for connection across said arc, said fixed voltage being substantially less than the voltage applied to said motor from across said arc whereby said motor is energized to move said electrode toward said work at a speed determined by the voltage across said arc, relay means for reversing the connections between said armature and said series field winding, and relay means responsive to the voltage across said arc and operative when the same is reduced to a predetermined value to operate said relay means to reverse said connections between said armature and series field winding and to connect said motor for energization directly to said fixed voltage source whereby said motor is reversed and said electrode is retracted thereby causing said arc voltage to increase.

7. In an automatic alternating current arc welding system wherein a welding electrode is moved relative to work and an arc is maintained therebetween from an alternating current source, in combination, an electric motor including an armature and a series field winding for moving said electrode, circuit means for connecting said armature and series field winding of said motor in series for energization to a fixed voltage source derived from said alternating current source, a transformer having a primary winding for connection across said arc and a secondary winding connected in series with said motor, said fixed voltage being substantially less than the voltage applied to said motor by said secondary winding whereby said motor is energized to move said electrode toward said work at a speed determined by the voltage across the arc, relay means for reversing the connections between said armature and said series field winding, and relay means responsive to the voltage across said arc and operative when the same is reduced to a predetermined value to operate said relay means to reverse said connections between said armature and series field winding and to connect said motor for energization directly to said fixed voltage source whereby said motor is reversed and said electrode is retracted thereby causing said arc voltage to increase.

8. In an automatic alternating current arc welding system wherein a welding electrode is moved relative to work and an arc is maintained therebetween from an alternating current source, in combination, an electric motor including an armature and a series field winding for moving said electrode, circuit means for connecting said armature and series field winding of said motor in series for energization to a fixed voltage source derived from said alternating current source, circuit means in series with said motor for connection across said arc, said fixed voltage being substantially less than the voltage applied to said motor from across said arc whereby said motor is energized to move said electrode toward said work at a speed determined by the voltage across said arc, a reversing relay for reversing the connections between said armature and said series field winding, a transfer relay for shifting the energizing circuit for said motor between said circuit means in series and the first mentioned circuit means, and relay means responsive to the voltage across said arc and operative when the same is reduced to a predetermined value to operate said relays to reverse said connections between said armature and said field winding and to connect said motor for energization directly to said fixed voltage source whereby said motor is reversed and said electrode is retracted thereby causing said arc voltage to increase.

9. The invention, as set forth in claim 8, wherein manually operable switch means are connected to control the reversing relay and the transfer relay to operate the motor selectively in one direction or the other to advance or retract the electrode.

10. The invention, as set forth in claim 8, wherein manually operable control switch means cooperate with the arc voltage relay means to complete energizing circuits for operating windings of the reversing and transfer relays on energization or deenergization of the circuit connected to the electrode and work, and auxiliary control switch means cooperate with said control switch means to open momentarily said energizing circuits to energize the motor to retract said electrode and withdraw it from said work thereby preventing the former from sticking to the latter on termination of the welding operation.

11. In an automatic arc welding system wherein a welding electrode is moved relative to work and an arc is maintained therebetween from a current source, in combination, an electric motor including a pair of windings for moving said electrode, circuit means for connecting said windings of said motor for energization to a fixed voltage source, circuit means in series with said motor for connection across said arc, said fixed voltage being substantially less than the voltage applied to said motor from across said arc whereby it is energized to move said electrode toward said work at a speed determined by the voltage across said arc, relay means for reversing the connections between said windings, and relay means responsive to the voltage across said arc and operative when the same is reduced to a predetermined value to operate said relay means to reverse said connections between said windings and to connect said motor for energization directly to said fixed voltage source whereby said motor is reversed and said electrode is retracted thereby causing said arc voltage to increase.

12. In an automatic arc welding system wherein a welding electrode is moved relative to work and an arc is maintained therebetween from a current source, in combination, an electric motor for moving said electrode, circuit means for connecting said motor for energization to a fixed voltage source, circuit means in series with said motor for connection across said arc, said fixed voltage being substantially less than and opposed to the voltage applied to said motor from across said arc whereby said motor is energized to move said electrode toward said work at a speed determined by the voltage across said arc, and relay means responsive to the voltage across said arc and operative when the same is reduced to a predetermined value to connect said motor for energization directly to said fixed voltage source in such manner as to reverse the same to retract said electrode and thereby increase said arc voltage.

13. In an automatic arc welding system wherein a welding electrode is moved relative to work and an arc is maintained therebetween from a current source, in combination, an electric motor for moving said electrode, circuit means for connecting said motor for energization to a fixed voltage source, circuit means in series with said motor for connection across said arc, said fixed voltage being substantially less than and added to the voltage applied to said motor from across said arc whereby said motor is energized to move said electrode toward said work at a speed determined by the voltage across said arc, and relay means responsive to the voltage across said arc and operative when the same is reduced to a predetermined value to connect said motor for energization directly to said fixed voltage source in such manner as to reverse the same to retract said electrode and thereby increase said arc voltage.

14. In an automatic alternating current arc welding system wherein a welding electrode is moved relative to work and an arc is maintained therebetween from an alternating current source, in combination, an electric motor including an armature and a series field winding for moving said electrode, circuit means for connecting said armature and series field winding of said motor in series for energization to a fixed voltage source derived from said alternating current source, and a transformer having a primary winding for connection across said arc and a secondary winding connected in series with said motor, said fixed voltage being substantially less than and in phase with the voltage applied to said motor by said secondary winding whereby said motor is energized to move said electrode toward said work at a speed determined by the voltage across said arc.

15. In an automatic alternating current arc welding system wherein a welding electrode is moved relative to work and an arc is maintained therebetween from an alternating current source, in combination, an electric motor for moving said electrode, circuit means for connecting said motor for energization to a fixed voltage source derived from said alternating current source, circuit means in series with said motor for connection across said arc, said fixed voltage being substantially less than and in phase with the voltage applied to said motor from across said arc whereby said motor is energized to move said electrode toward said work at a speed determined by the voltage across said arc, and relay means responsive to the voltage across said arc and operative when the same is reduced to a predetermined value to connect said motor for energization directly to said fixed voltage source in such manner as to reverse the same to retract said electrode and thereby increase said arc voltage.

16. In an automatic alternating current arc welding system wherein a welding electrode is moved relative to work and an arc is maintained therebetween from an alternating current source, in combination, an electric motor including an armature and a series field winding for moving said electrode, circuit means for connecting said armature and series field winding of said motor in series for energization to a fixed voltage source derived from said alternating current source, circuit means in series with said motor for connection across said arc, said fixed voltage being substantially less than and in phase with the voltage applied to said motor from across said arc whereby said motor is energized to move said electrode toward said work at a speed determined by the voltage across said arc, relay means for reversing the connections between said armature and said series field winding, and relay means responsive to the voltage across said arc and operative when the same is reduced to a predetermined value to operate said relay means to reverse said connections between said armature and series field winding and to connect said motor for energization directly to said fixed voltage source whereby said motor is reversed and said electrode is retracted thereby causing said arc voltage to increase.

17. In an automatic alternating current arc welding system wherein a welding electrode is moved relative to work and an arc is maintained therebetween from an alternating current source, in combination, an electric motor including an armature and a series field winding for moving said electrode, circuit means for connecting said armature and series field winding of said motor in series for energization to a fixed voltage source derived from said alternating current source, a transformer having a primary winding for connection across said arc and a secondary winding connected in series with said motor, said fixed voltage being substantially less than and in phase with the voltage applied to said motor by said secondary winding whereby said motor is energized to move said electrode toward said work at a speed determined by the voltage across said arc, relay means for reversing the connections between said armature and said series field winding, and relay means responsive to the voltage across said arc and operative when the same is reduced to a predetermined value to operate said relay means to reverse said connections between said armature and series field winding and to connect said motor for energization directly to said fixed voltage source whereby said motor is reversed and said electrode is retracted thereby causing said arc voltage to increase.

18. In an automatic alternating current arc welding system wherein a welding electrode is moved relative to work and an arc is maintained therebetween from an alternating current source, in combination, an electric motor including an armature and a series field winding for moving said electrode, circuit means for connecting said armature and series field winding of said motor in series for energization to a fixed voltage source derived from said alternating current source, circuit means in series with said motor for connection across said arc, said fixed voltage being substantially less than and in phase with the voltage applied to said motor from across said arc whereby said motor is energized to move said electrode toward said work at a speed determined by the voltage across said arc, a reversing relay for reversing the connections between said armature and said series field winding, a transfer relay for shifting the energizing circuit for said motor between said circuit means in series and the first mentioned circuit means, and relay means responsive to the voltage across said arc and operative when the same is reduced to a predetermined value to operate said relays to reverse said connections between said armature and said field winding and to connect said motor for energization directly to said fixed voltage source whereby said motor is reversed and said electrode is retracted thereby causing said arc voltage to increase.

19. In an automatic alternating current arc welding system wherein a welding electrode is moved relative to work and an arc is maintained therebetween from an alternating current source, in combination, an electric motor including an armature and a series field winding for moving said electrode, circuit means for connecting said armature and series field winding of said motor in series for energization to a fixed voltage source derived from said alternating current source, a transformer having a primary winding for connection across said arc and a secondary winding connected in series with said motor, said fixed voltage being substantially less than and in phase with the voltage applied to said motor by said secondary winding whereby said motor is energized to move said electrode toward said work at a speed determined by the voltage across said arc, a reversing relay for reversing the connections between said armature and said series field winding, a transfer relay for shifting the energizing circuit for said motor between said circuit means and secondary winding in series and the first mentioned circuit means, and relay means responsive to the voltage across said arc and operative when the same is reduced to a predetermined value to operate said relays to reverse said connections between said armature and said field winding and to connect said motor for energization directly to said fixed voltage source whereby said motor is reversed and said electrode is retracted thereby causing said arc voltage to increase.

20. In an automatic arc welding system wherein a welding electrode is moved relative to work and an arc is maintained therebetween from a current source, in combination, an electric motor including a pair of windings for moving said electrode, circuit means for connecting said windings of said motor for energization to a fixed voltage source, circuit means in series with said motor for connection across said arc, said fixed voltage being substantially less than and added to the voltage applied to said motor from across said arc whereby it is energized to move said electrode toward said work at a speed determined by the voltage across said arc, relay means for reversing the connections between said windings, and relay means responsive to the voltage across said arc and operative when the same is reduced to a predetermined value to operate said relay means to reverse said connections between said windings and to connect said motor for energization directly to said fixed voltage source whereby said motor is reversed and said electrode is retracted thereby causing said arc voltage to increase.

21. In an automatic alternating current arc welding system wherein a welding electrode is moved relative to work and an arc is maintained therebetween from an alternating current source, in combination, an electric motor having a pair of windings for moving said electrode, circuit means for connecting said windings of said motor for energization to a fixed voltage source derived from said alternating current source, circuit means in series with said motor for connection across said arc, said fixed voltage being substantially less than and in phase with the voltage applied to said motor from across said arc whereby said motor is energized to move said electrode toward said work at a speed determined by the voltage across said arc, relay means for reversing the connections between said windings, and relay means responsive to the voltage across said arc and operative when the same is reduced to a predetermined value to operate said relay means to reverse said connections between said windings and to connect said motor for energization directly to said fixed voltage source whereby said motor is reversed and said electrode is retracted thereby causing said arc voltage to increase.

22. In an automatic arc welding system wherein a welding electrode is moved relative to work and an arc is maintained therebetween from a current source, in combination, an electric motor for moving said electrode, circuit means for connecting said motor through a resistor for energization to a fixed voltage source, circuit means in series with said motor for connection across said arc, said fixed voltage being substantially less than the voltage applied to said motor from across said arc whereby said motor is energized to move said electrode toward said work at a speed determined by the voltage across said arc, relay means responsive to the voltage across said arc and operative when the same is reduced to a predetermined value to connect said motor for energization directly to said fixed voltage source in such manner as to reverse the same to retract said electrode and thereby increase said arc voltage, and manually operable switch means connected to control the connection of said motor independently of said arc voltage to said fixed voltage source and to short circuit said resistor and operate said motor selectively in one direction or the other.

ALFRED F. CHOUINARD.

REFERENCES CITED

The following references are of record in the file of this patent:

UNITED STATES PATENTS

| Number | Name | Date |
|---|---|---|
| 1,915,981 | Davis | June 27, 1933 |
| 1,969,520 | Nagashev | Aug. 7, 1934 |
| 1,976,551 | Frick | Oct. 9, 1934 |
| 1,982,327 | Smith | Nov. 27, 1934 |
| 2,008,411 | Blankenbuehler et al. | July 16, 1935 |
| 2,145,010 | Kennedy et al. | Jan. 24, 1939 |